(12) United States Patent
Ventosa et al.

(10) Patent No.: US 11,876,270 B2
(45) Date of Patent: Jan. 16, 2024

(54) REDOX-FLOW BATTERY FOR ENERGY STORAGE

(71) Applicant: FUNDACIÓN IMDEA ENERGÍA, Madrid (ES)

(72) Inventors: Edgar Ventosa, Madrid (ES); Teresa Paez, Madrid (ES); Jesús Palma, Madrid (ES)

(73) Assignee: Fundación Imdea Energía, Madrid (ES)

( * ) Notice: Subject to any disclaimer, the term of this patent is extended or adjusted under 35 U.S.C. 154(b) by 256 days.

(21) Appl. No.: 17/416,760

(22) PCT Filed: Dec. 19, 2019

(86) PCT No.: PCT/EP2019/086203
§ 371 (c)(1),
(2) Date: Jun. 21, 2021

(87) PCT Pub. No.: WO2020/127661
PCT Pub. Date: Jun. 25, 2020

(65) Prior Publication Data
US 2022/0077483 A1 Mar. 10, 2022

(30) Foreign Application Priority Data
Dec. 21, 2018 (EP) .................... 18382971

(51) Int. Cl.
*H01M 8/18* (2006.01)
*H01M 4/36* (2006.01)
(Continued)

(52) U.S. Cl.
CPC .......... *H01M 8/188* (2013.01); *H01M 4/368* (2013.01); *H01M 4/52* (2013.01); *H01M 8/04201* (2013.01); *H01M 2300/0014* (2013.01)

(58) Field of Classification Search
CPC .............................................. H01M 8/18–188
See application file for complete search history.

(56) References Cited

U.S. PATENT DOCUMENTS 4,180,623 A 12/1979 Adams
9,368,824 B2 6/2016 Xia et al.
(Continued)

OTHER PUBLICATIONS

Carpenter, Michael K. et al., "The Electrochromic Properties of Hydrous Nickel Oxide", Solar Energy Materials, 1987, vol. 16, pp. 333-346.
(Continued)

*Primary Examiner* — Matthew J Merkling
(74) *Attorney, Agent, or Firm* — Gary J. Gershik

(57) ABSTRACT

The present invention refers to a redox-flow battery (1) comprising a positive compartment (10) comprising a positive electrode (11) and a catholyte, wherein said catholyte is an alkaline ferrocyanide solution; a catholyte reservoir container (12) connected in fluid communication with the positive compartment (10) through at least one conduct (13) and said container (12) comprising catholyte and a solid electroactive material (14), wherein said solid electroactive material is confined within the container and is selected from the group consisting of a metal oxide, a metal hydroxide, a metal oxyhydroxide or a combination thereof; a negative compartment (20) comprising a negative electrode (21) and an anolyte, wherein said anolyte is an alkaline solution; an anolyte reservoir container (22) connected in fluid communication with the negative compartment (20) through at least one conduct (23) and said container (22) comprising anolyte; and a power/load source (40). In addition, the present invention is directed to an energy storage system comprising at least one redox-flow battery (1) as defined above, to a method of storing electricity comprising providing a redox-flow battery (1) as defined above, a method of
(Continued)

Figure 1:
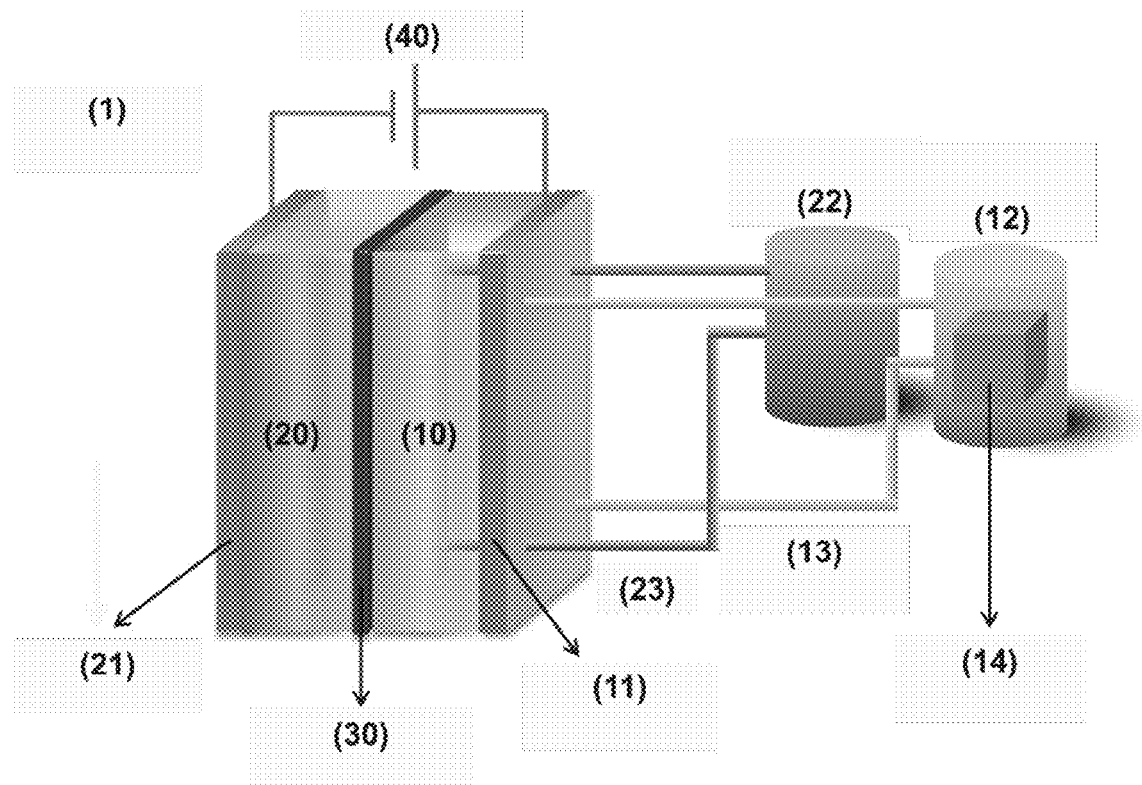

delivering electricity comprising providing a redox-flow battery (1) as defined above, to the use of the redox-flow battery (1) as defined above to store or deliver electricity and to the use of the redox-flow battery (1) as defined above in renewable energy and electromobility sectors.

13 Claims, 6 Drawing Sheets

(51) Int. Cl.
*H01M 4/52* (2010.01)
*H01M 8/04082* (2016.01)

(56) References Cited

U.S. PATENT DOCUMENTS

| | | | |
|---|---|---|---|
| 9,929,425 | B2 | 3/2018 | Esswein et al. |
| 2015/0048777 | A1 | 2/2015 | Goldstein |
| 2017/0271703 | A1 | 9/2017 | Hammad et al. |
| 2018/0366280 | A1* | 12/2018 | Hwang .................. H01G 11/70 |
| 2018/0366757 | A1 | 12/2018 | Wei et al. |

OTHER PUBLICATIONS

European Search Report dated Jun. 27, 2019 in connection with European Patent Application No. EP 18382971.2.

International Preliminary Report on Patentability dated Mar. 9, 2021 in connection with PCT International Application No. PCT/EP2019/086203.

International Search Report dated Mar. 2, 2020 in connection with PCT International Application No. PCT/EP2019/086203.

Hollas, Aaron et al., "A biomimetic high-capacity phenazine-based anolyte for aqueous organic redox flow batteries", Nature Energy, 2018, vol. 3, pp. 508-514.

Lin, Kaixiang et al., "Alkaline quinone flow battery", Science, 2015, vol. 349(6255), pp. 1529-1532.

Lin, Kaixiang et al., "A redox-flow battery with an alloxazine-based organic electrolyte", Nature Energy, 2016, vol. 1, pp. 1-8.

Luo, Jian et al., "Unraveling pH Dependent Cycling Stability of Ferricyanide/Ferrocyanide in Redox Flow Batteries", Nano Energy, 2017, vol. 42, pp. 215-221.

Viswanathan, Vilayanur et al., "Cost and performance model for redox flow batteries", Journal of Power Sources, 2014, vol. 247, pp. 1040-1051.

Wang, Wei et al., "Recent Progress in Redox Flow Battery Research and Development", Advanced Function Materials, 2012, vol. 33, pp. 1-17.

Weber, Adam Z., "Redox flow batteries: a review", J Appl Electrochem, 2011, vol. 41, pp. 1137-1164.

Yang, Zhengjin et al., "Alkaline Benzoquinone Aqueous Flow Battery for Large-Scale Storage of Electrical Energy", Advanced Energy Materials, 2017, vol. 8(8).

* cited by examiner

REDOX-FLOW BATTERY FOR ENERGY STORAGE

RELATED APPLICATIONS

This application is a § 371 national stage of PCT International Application No. PCT/EP2019/086203, filed Dec. 19, 2019, claiming priority of European Patent Application No. EP 18382971.2, filed Dec. 21, 2018, the contents of each of which are hereby incorporated by reference into this application.

Technical Field

The present invention relates to the field of batteries. More specifically, the present invention relates to the field of redox-flow batteries.

BACKGROUND

Due to the increased energy consumption and demand worldwide, renewable energy power generation, such as from solar and wind, is highly attractive, but their intermittent nature is problematic. To compensate for this drawback, the use and development of appropriate energy-storage systems have been heavily pursued. The existing energy storage technologies are classified as pumped hydropower, compressed air energy storage, electrochemical batteries, capacitors, flywheel, superconducting magnetic energy storage and thermal energy storage.

Electrochemical storage devices particularly redox-flow batteries (RFBs) have been proposed as promising choices for grid-scale storage systems because of unique advantages they present, such as their flexible, modular design and fast response time (Wang et al. Adv Func Mater, 2013, 23(8): 970-986). RFBs are one of the classes of electrochemical energy storage devices, which are featured by the redox reactions. The name 'redox' refers to chemical reduction and oxidation reactions through which energy is stored in liquid electrolyte solutions, which flow through a battery of electrochemical cells during charge and discharge. During discharge, an electron is released via an oxidation reaction from a high chemical potential state on the negative or anode side of the battery. The electron moves through an external circuit to do useful work. Finally, the electron is accepted via a reduction reaction at a lower chemical potential state on the positive or cathode side of the battery. The direction of the current and the chemical reactions are reversed during charging.

There are different types of RFB systems such as iron-chromium, bromine-polysulfide, iron-vanadium, all-vanadium, vanadium-bromine, vanadium-oxygen, zinc-bromine that have been the topic of intense investigations (Weber et al. J. Appl. Electrochem. 2011, 41(10):1137). In spite of being advantageous, these redox-flow batteries face challenges in terms of cost, availability and eco-friendliness (Viswanathan et al. J. Power Sources, 2014, 247:1040-1051). The all-iron redox-flow batteries present an attractive solution because of the use of inexpensive materials, abundantly available iron and non-toxic nature of the system.

The ferrocyanide is a partially soluble species that is able to reversibly store energy through an electrochemical redox reaction. As such, this species has been used in the positive compartment of a variety of redox-flow batteries, e.g. ZnO/$K_4Fe(CN)_6$ [U.S. Pat. No. 4,180,623, 25 Dec. 1979], anthraquinone/$K_4Fe(CN)_6$ [Lin et al. Science, 2015, 349, 1529-1532], benzoquinone/$K_4Fe(CN)_6$ [Z. Yang et al. Advanced Energy Materials, 2017, 17, 1702056], phenazines/$K_4Fe(CN)_6$ [A. Hollas et al. Nature Energy, 2018, 3, 508-514] or vitamin B/$K_4Fe(CN)_6$ [K. Lin et al. Nature Energy, 2016, 1, 16102]. All these systems typically use alkaline aqueous electrolytes based on highly caustic potassium hydroxide, KOH. The high alkalinity is used to maintain a high ionic conductivity between the electrodes, while minimizing corrosion. In all these cases, the energy density of the system is precisely limited by the low solubility of ferrocyanide in alkaline media (0.4 M equivalent to 10 $AhL^{-1}$). This is due to the fact that the energy density of species dissolved in a solution increases with increased concentration of active species (equation 1—energy density defines battery capacity in volume ($AhL^{-1}$)).

$$Q = n \cdot F \cdot C \qquad (\text{eq. 1})$$

where Q, n, F y C are charge storage capacity ($AhL^{-1}$), number of exchanged electrons, Faraday constant ($Ahmole^{-1}$) and concentration of active species ($moleL^{-1}$).

So the energy density of the positive compartment of the above mentioned ferrocyanide-based redox-flow batteries of the state of the art is limited by this number (10 $AhL^{-1}$). Efforts have been devoted to increase the energy density of the positive compartment in ferrocyanide-based alkaline redox-flow batteries. Two main strategies have been proposed which are both based on increasing the solubility of ferrocyanide. Firstly, by reducing the pH of the electrolyte solution [U.S. Pat. No. 9,929,425 B2, 6 May 2014]. The solubility and, thus, the energy density of an electrolyte solution of ferrocyanide increases with decreasing pH. For example, the solubility of potassium ferrocyanide increases from 0.4 M to 1 M when the concentration of potassium hydroxide is decreased from 1 M to 0.1 M. However, decreasing pH following this first approach is likely to decrease the calendar life of the battery due to enhanced corrosion. Secondly, by avoiding the common ion effect [U.S. Pat. No. 9,368,824 B2, 14 Jun. 2016]. Since the ferrocyanide is an anion, the solubility is higher when the cation of the supporting salt of the solution is different from the contra-cation of the ferrocyanide anion. For example, the solubility of potassium ferrocyanide ($K_4Fe(CN)_6$) is higher when sodium hydroxide is used as electrolyte salt than when potassium hydroxide is used. However, this approach requires $Na_4Fe(CN)_6$ for the electrolyte preparation, which is more expensive than $K_4Fe(CN)_6$ typically used.

Therefore, despite the above-mentioned systems, it is still desirable to develop alternatives in order further increase the energy density of the positive compartment in ferrocyanide-based alkaline flow batteries.

BRIEF DESCRIPTION OF THE INVENTION

The authors of the present invention have designed a redox-flow battery based on the pair ferrocyanide/ferricyanide having increased energy density by using an electroactive material in solid phase that is confined within an external catholyte reservoir container.

The increased energy density ($AhL^{-1}$) of the battery of the present invention leads to lower material cost since the cost of material for storage charge [$€Ah^{-1}$] is lower compared to other redox-flow batteries of the state of the art.

Thus, a first aspect of the invention is directed to a redox-flow battery comprising:
  a) a positive compartment comprising a positive electrode and a catholyte, wherein said catholyte is an alkaline ferrocyanide solution;

b) a catholyte reservoir container connected in fluid communication with the positive compartment through at least one conduct and said container comprising catholyte and a solid electroactive material, wherein said solid electroactive material is confined within the container and is selected from the group consisting of a metal oxide, a metal hydroxide, a metal oxyhydroxide or a combination thereof;

c) a negative compartment comprising a negative electrode and an anolyte, wherein said anolyte is an alkaline solution;

d) an anolyte reservoir container connected in fluid communication with the negative compartment through at least one conduct and said container comprising anolyte; and e) a power/load source.

The redox-flow battery of the present invention is configured to act as an energy storage and delivery system. In particular, the redox-flow battery is a secondary or rechargeable battery, i.e. it is configured to be reversibly charged and discharged.

Therefore, in a second aspect, the present invention is directed to an energy storage and/or delivery system comprising at least one redox-flow battery as defined above.

In addition, in a third aspect, the present invention is directed to a method of storing electricity comprising the steps of:

a) providing a redox-flow battery as define above;

b) oxidizing the ferrocyanide species of the catholyte at the positive compartment to ferricyanide while the anolyte active species are reduced to the corresponding reduced state at the negative compartment;

c) letting flow the oxidized catholyte of step (b) into the catholyte reservoir container and the reduced anolyte of step (b) into the anolyte reservoir container; and d) storing charge in the solid electroactive material at the catholyte reservoir container by charge transfer between the oxidized catholyte and the solid electroactive material so that ferricyanide species of the oxidized catholyte of step (c) are reduced back to ferrocyanide by oxidation of the solid electroactive material at the catholyte reservoir container.

A fourth aspect of the present invention is directed to a method of delivering electricity comprising the steps of:

a) providing a redox-flow battery as defined above;

b) reducing the ferricyanide of the catholyte at the positive compartment to ferrocyanide while the reduced anolyte active species are oxidized back to the corresponding oxidized state at the negative compartment;

c) letting flow the reduced catholyte of step (b) into the catholyte reservoir container and the oxidized anolyte of step (b) into the anolyte reservoir container; and d) delivering the charge stored in the solid electroactive material in its oxidized state at the catholyte reservoir container by charge transfer between the reduced catholyte and the oxidized solid electroactive material so that the ferrocyanide species of the reduced catholyte of step (c) are oxidized back to ferricyanide by reduction of the solid electroactive material at the cathode reservoir container.

Additional aspects of the present invention are directed to the use of the redox-flow battery as defined above to store or deliver energy, and to the use of the redox-flow battery as defined above in the renewable energy and electromobility sectors.

FIGURES

FIG. 1. Scheme of a redox-flow battery according to a particular embodiment of the present invention.

Figure 2:
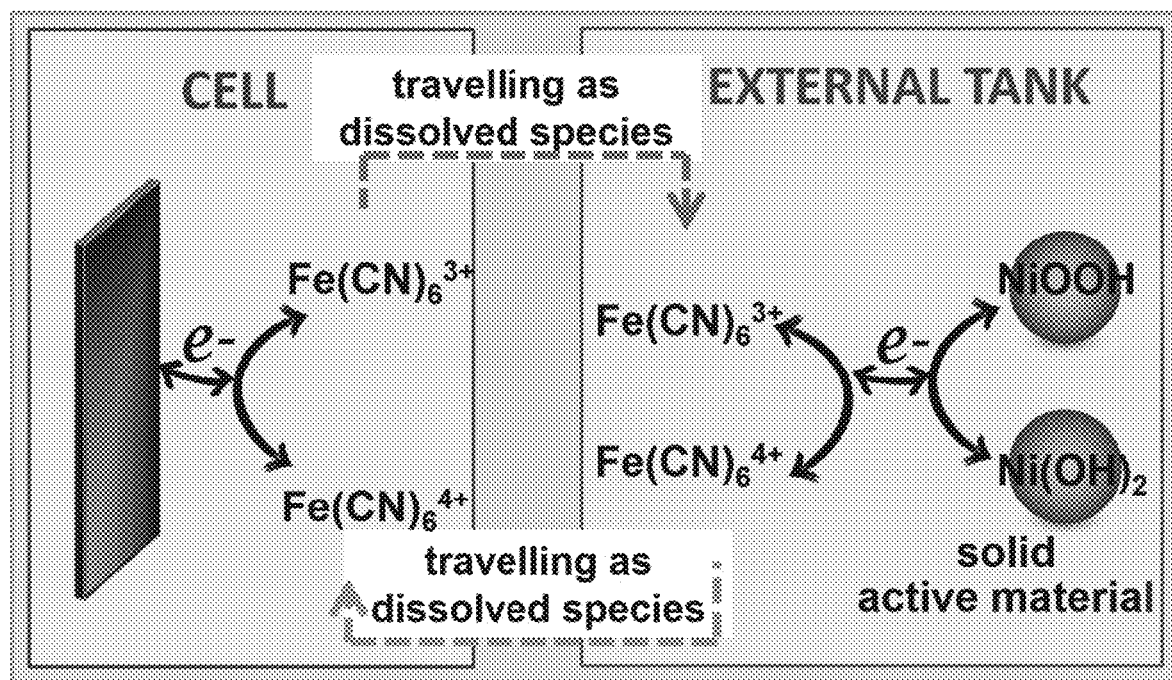

FIG. 2. Schematic representation of the charge transfer mechanism between the cathode (11) located in the positive compartment (10) and the solid active material (14), e.g. $Ni(OH)_2$, located in the catholyte reservoir container (12) of a redox-flow battery (1). The pair ferrocyanide/ferricyanide acts as charge carrier.

Figure 3:
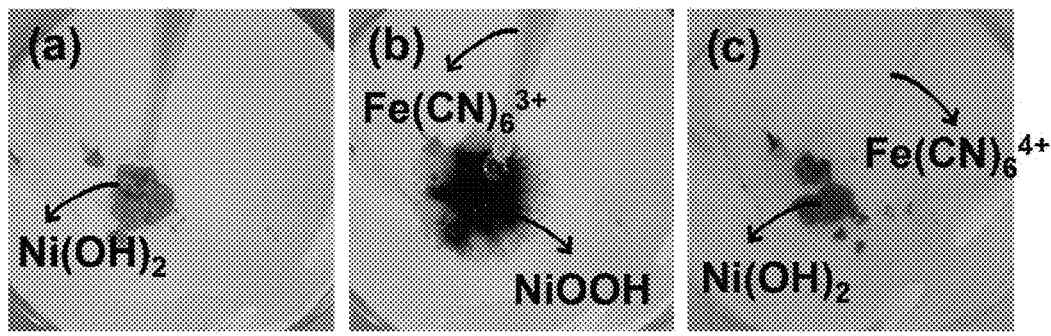

FIG. 3. Three photograms of a video in which the spontaneous charge transfer between ferrocyanide/ferricyanide and $Ni(OH)_2/NiOOH$ is demonstrated, wherein (a) shows a sample of $Ni(OH)_2$ placed in a paper filter; (b) shows ferricyanide being added to the $Ni(OH)_2$ sample, which leads to a change of the color, indicating the oxidation of $Ni(OH)_2$ to $NiOOH$; and (c) shows ferrocyanide being added to the sample, which provokes the reduction of $NiOOH$ back to $Ni(OH)_2$ recovering its initial color.

Figure 4:
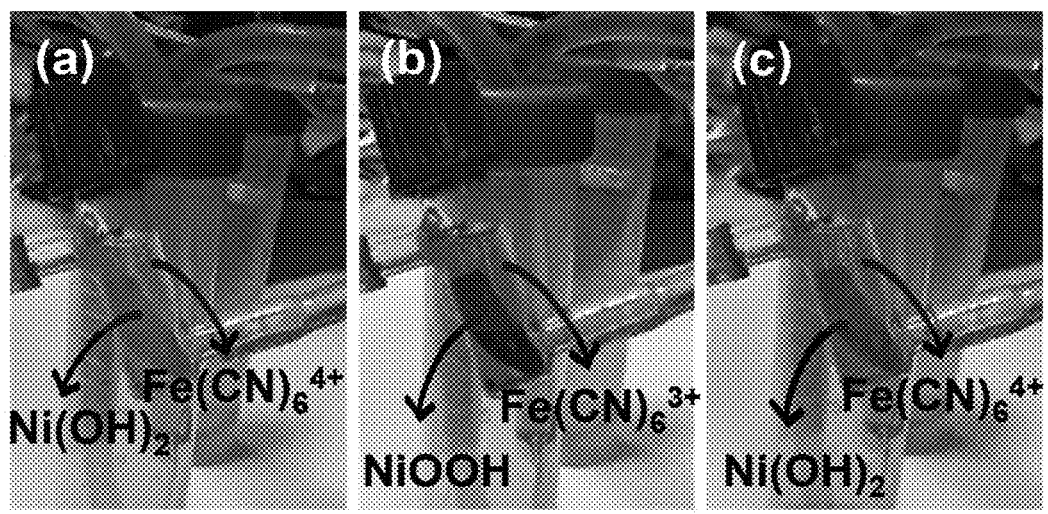

FIG. 4. Confirmation of spontaneity of charge transfer between ferrocyanide/ferricyanide and $Ni(OH)_2/NiOOH$ using a flow cell to oxidize and reduce ferrocyanide/ferricyanide, wherein (a) is a sample of $Ni(OH)_2$ immersed in the external catholyte reservoir of a redox-flow cell according to the present invention in the presence of ferrocyanide; (b) is ferrocyanide electrochemically oxidized to ferricyanide, which reacts spontaneously with $Ni(OH)_2$ in the external catholyte reservoir generating $NiOOH$ (the reaction is evidenced by the change of color of the sample); and (c) is ferricyanide, previously generated, being electrochemically reduced back to ferrocyanide, which reacts spontaneously with $NiOOH$, returning to its initial reduced state $Ni(OH)_2$ (the reaction is evidenced by the change of color of the sample).

Figure 5:
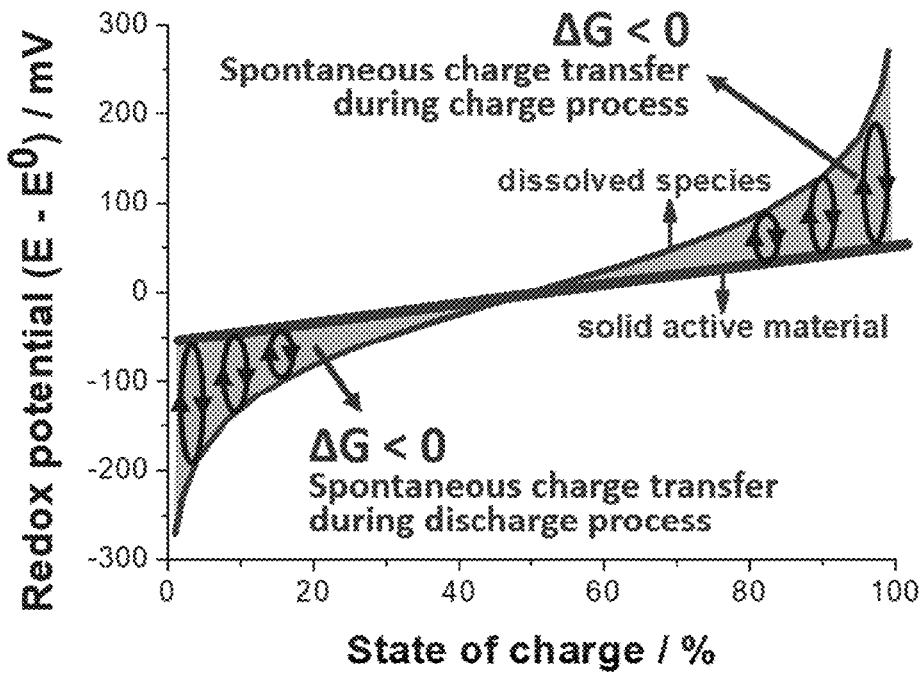

FIG. 5. Scheme that illustrates the conditions required for spontaneity of charge transfer between dissolved redox species and solid electroactive material: $K_3Fe(CN)_6$—$Ni(OH)_2$ during charging process, and $K_4Fe(CN)_6$ and $NiOOH$ during discharging process. The redox potential of the catholyte solution that contains ferrocyanide and ferricyanide should be above that of $Ni(OH)_2/NiOOH$ during charging process, and below of $Ni(OH)_2/NiOOH$ during discharging process so that spontaneous charge transfer between liquid and solid occurs.

Figure 6:
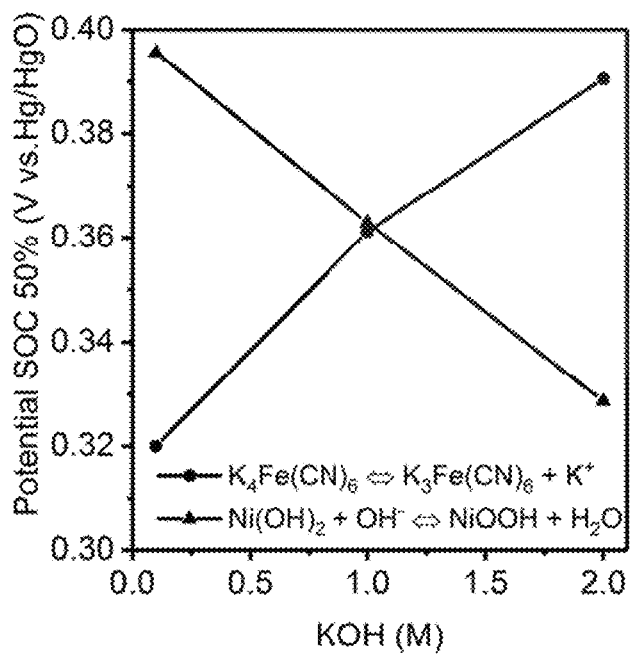

FIG. 6. Evolution of redox potential that was measured at open circuit at 50% state of charge (SOC) with the concentration of KOH. The relation is not completely linear because the redox potential is dependent on the activity of species, instead of concentration. At high concentration, the activity coefficient diverges from the unity.

Figure 7:
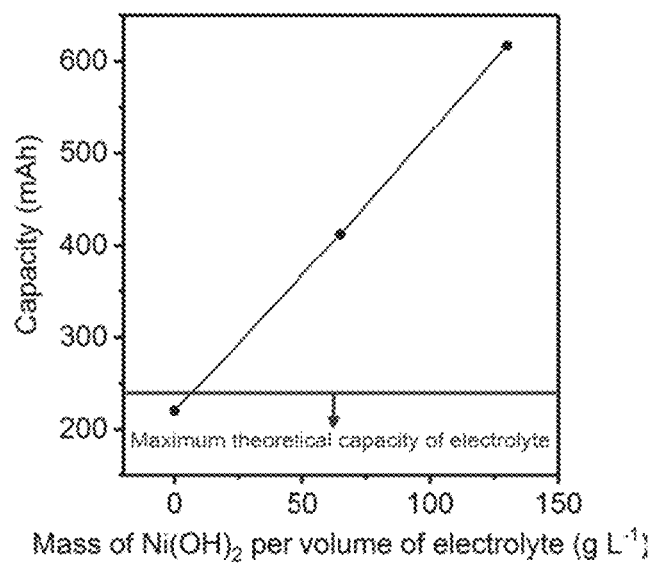

FIG. 7. Evolution of the reversible storage charge as a function of the concentration of $Ni(OH)_2$ in the electrolyte ($g_{solid}/L_{electrolyte}$). Every g of $Ni(OH)_2$/electrode contains approximately 0.5 g of $Ni(OH)_2$, and stores 125 $mAhg_{electrode}^{-1}$. Therefore, 4 g and 8 g of $Ni(OH)_2$/electrode should increase the stored charge in 500 mAh and 1000 mAh, respectively. In this experiment, the stored charge increased 194 and 398 for 4 g and 8 g of $Ni(OH)_2$/electrode, respectively, in 30 mL of electrolyte (catholyte). The concentration of $Ni(OH)_2$ was 65 and 130 $g_{N(OH)2}L_{electrolyte}^{-1}$, respectively. A large excess of active species was added to the negative compartment of a symmetrical cell (800 mAh for negative versus 240 mAh for the positive compartment) to make the positive compartment the limiting side.

Figure 8:
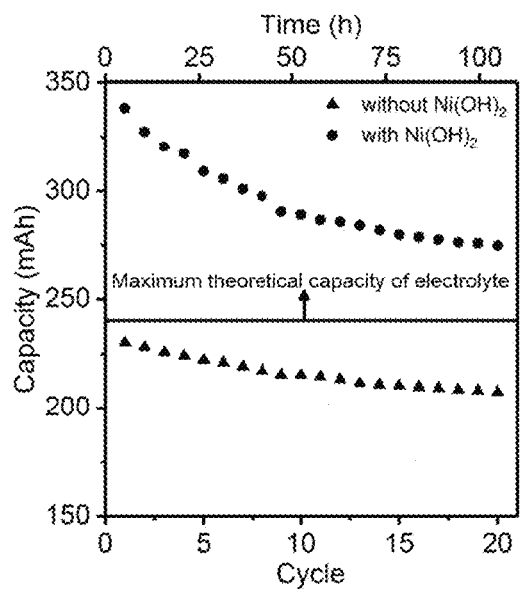

FIG. 8. Reversible stored charge during the first 20 cycles of a 2,6-dihydroxi-anthraquinone (45 mL, 0.2 M)/$K_4Fe(CN)_6$ (30 mL, 0.3 M) redox-flow battery according to the present invention. Triangles correspond to the redox-flow battery in the absence of solid $Ni(OH)_2$ in the external catholyte reservoir container (12), while circles correspond to the redox-flow battery in the presence of solid $Ni(OH)_2$ in the external catholyte reservoir container (12). It should be noted that the maximum theoretical charge stored in the electrolyte (catholyte) in the absence of solid Ni(OH)$_2$ is 240 mAh.

Figure 9:
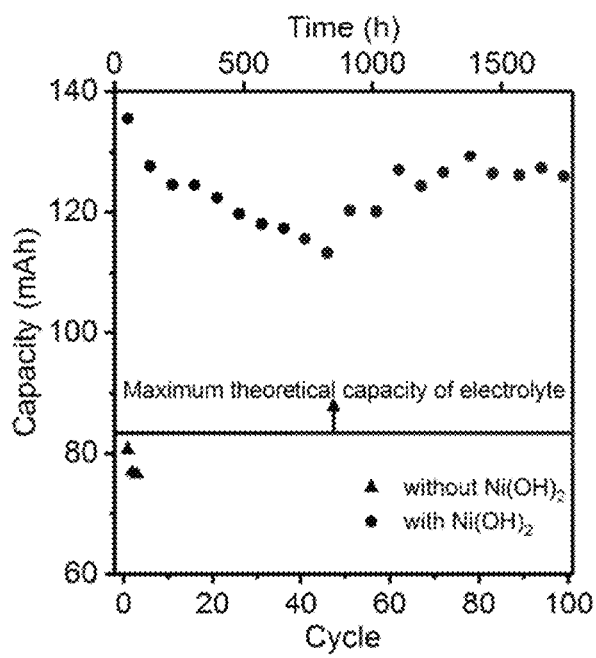

FIG. 9. Reversible stored charge during the first 5 cycles of a phenazine-derivative (10 mL, 0.3 M)/K$_4$Fe(CN)$_6$ (10 mL, 0.3 M) redox-flow battery according to the present invention. Triangles correspond to the redox-flow battery in the absence of solid Ni(OH)$_2$ in the external catholyte reservoir container (12), while circles correspond to the redox-flow battery in the presence of solid Ni(OH)$_2$ in the external catholyte reservoir container (12). It should be noted that the maximum theoretical charge stored in the electrolyte (catholyte) in the absence of solid Ni(OH)$_2$ electrode is 80.4 mAh.

Figure 10:
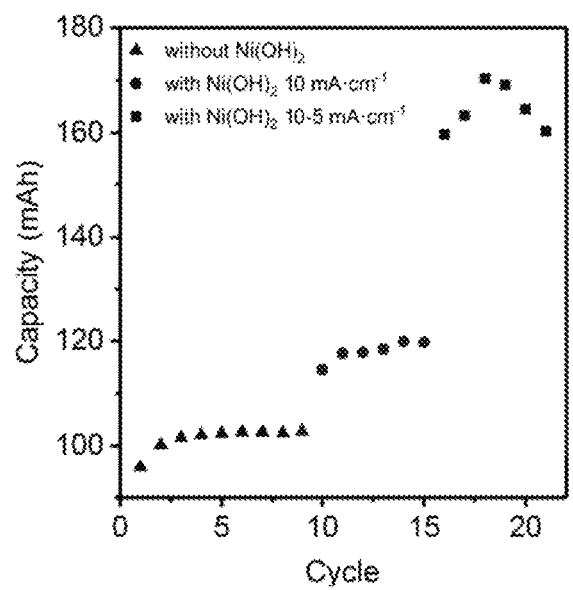

FIG. 10. Reversible stored charge during the first 20 cycles of a ZnO (13 mL, 0.5 M)/K$_4$Fe(CN)$_6$ (13 mL, 0.3 M) redox-flow battery according to the present invention. Triangles correspond to the redox-flow battery in the absence of solid Ni(OH)$_2$ in the external catholyte reservoir container (12), while circles correspond to the redox-flow battery in the presence of solid Ni(OH)$_2$ in the external catholyte reservoir container (12). The decrease in the applied current density resulted in further increase in the reversible storage charge of the battery (squares), indicating that higher utilization rate of the solid is possible if charge transfer kinetics between electrolyte (catholyte) and solid are improved. It should be noted that the maximum theoretical charge stored in the electrolyte (catholyte) in the absence of solid Ni(OH)$_2$ is 104 mAh.

Figure 11:
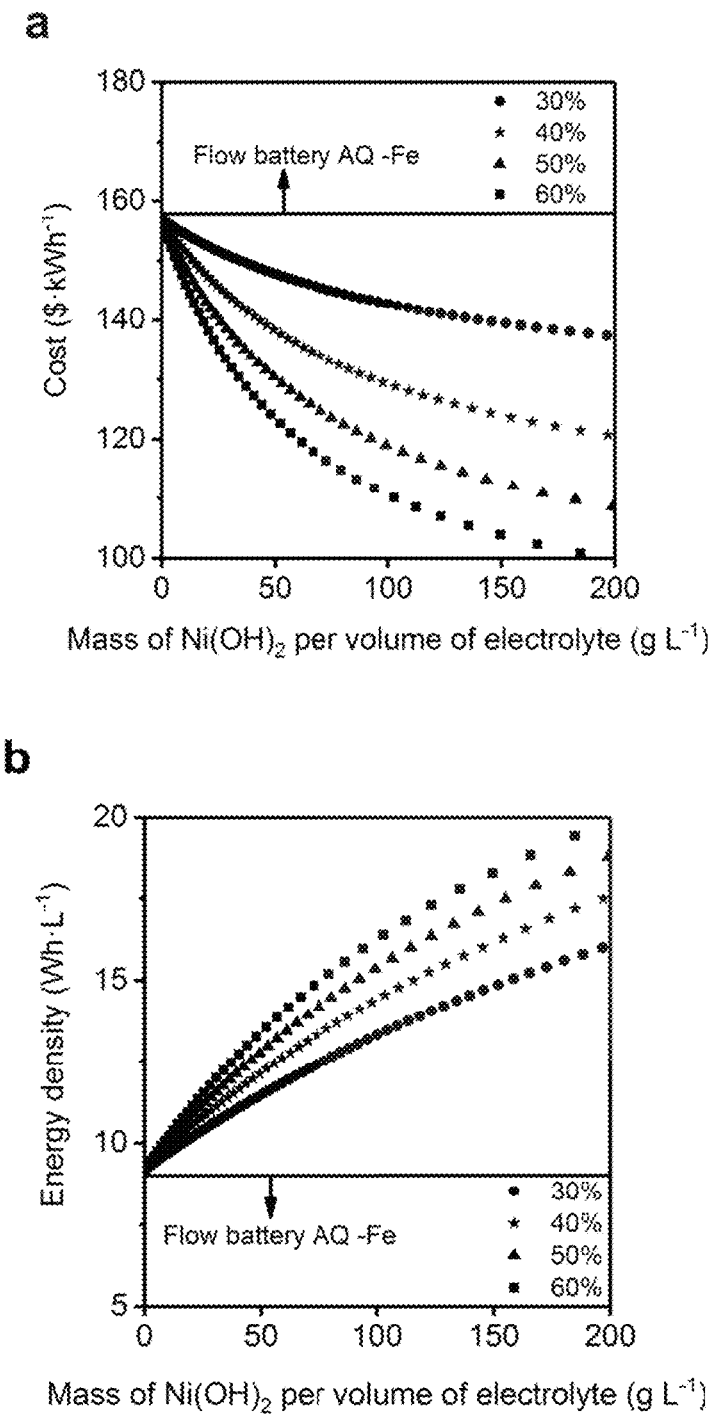

FIG. 11. Evolution of (a) energy density and (b) cost of an anthraquinone/K$_4$Fe(CN)$_6$ redox-flow battery according to the present invention as a function of the amount of solid Ni(OH)$_2$ added to the electrolyte (catholyte). Four curves are obtained for different utilization rates of solid Ni(OH)$_2$. The value of the anthraquinone/K$_4$Fe(CN)$_6$ redox-flow battery without solid Ni(OH)$_2$ is included as reference.

DETAILED DESCRIPTION OF THE INVENTION

In the context of the present invention, the term "flow battery" is intended to refer to a battery system in which reactants and products are transported into and out of the battery. The term "redox-flow" refers to chemical reduction and oxidation reactions which help to store energy in liquid electrolyte solutions which flow through a battery during charge and discharge.

The redox-flow battery of the invention is configured to act as an energy storage and delivery system. In particular, the redox-flow battery is a secondary or rechargeable battery, i.e. it is configured to be reversibly charged and discharged.

As defined above, in a first aspect, the present invention refers to a redox-flow battery (1) comprising:
  a) a positive compartment (10) comprising a positive electrode (11) and a catholyte, wherein said catholyte is an alkaline ferrocyanide solution;
  b) a catholyte reservoir container (12) connected in fluid communication with the positive compartment (10) through at least one conduct (13) and said container (12) comprising catholyte and a solid electroactive material (14), wherein said solid electroactive material is confined within the container (12) and is selected from the group consisting of metal oxide, a metal hydroxide, a metal oxyhydroxide or a combination thereof;
  c) a negative compartment (20) comprising a negative electrode (21) and an anolyte, wherein said anolyte is an alkaline solution;
  d) an anolyte reservoir container (22) connected in fluid communication with the negative compartment (20) through at least one conduct (23) and said container (22) comprising anolyte; and
  e) a power/load source (40).

An exemplary embodiment of the redox-flow battery (1) of the invention is illustrated in FIG. 1.

Positive Compartment

As defined above, the positive compartment (10) comprised in the redox-flow battery (1) of the present invention comprises:
  a positive electrode (11); and
  a catholyte.

The positive electrode (or cathode) (11) is where the oxidation and reduction of dissolved catholyte active species takes place.

Non-limiting examples of suitable positive electrodes (11) in the redox-flow battery of the present invention (1) are graphite felt, carbon felt, carbon nanotubes and other porous carbonaceous matrices.

In a preferred embodiment, the positive electrode (11) is made of graphite, more preferably graphite felt.

The catholyte comprised in the positive compartment (10) of the redox-flow battery (1) of the present invention is an alkaline ferrocyanide solution. The alkalinity of the catholyte (and the anolyte) is used to maintain a high ionic conductivity between the electrodes, while minimizing corrosion.

In a preferred embodiment, said alkalinity is obtained by using a hydroxyl ion-conducting media, more preferably an alkaline metal hydroxide, even more preferably, the alkaline metal hydroxide is potassium hydroxide (KOH).

Therefore, in a preferred embodiment, the catholyte is a potassium ferrocyanide solution.

The catholyte solution may have different proportions of ferrocyanide and alkaline metal hydroxide, however, it is desirable a high concentration of ferrocyanide from the scaling point of view and to obtain higher energy densities, enhanced charge transfer kinetics between redox electrolyte and solid electroactive material and, in general, better results.

Therefore, in a preferred embodiment, the concentration of ferrocyanide ranges from 0.1 to 1.5 M, more preferably from 0.3 to 1 M, whereas the concentration of alkaline metal hydroxide may range from 0.5 to 5 M, more preferably from 1 to 3 M, being preferred the use of KOH in a concentration of 1.5 M.

Catholyte Reservoir Container

The catholyte reservoir container or tank (12) comprised in the redox-flow battery (1) of the present invention is an external container configured to store and receive catholyte (as ferricyanide or ferrocyanide depending on the charging or discharging mode of the battery) from the positive compartment (10). Before operation of the battery (1), the catholyte reservoir container (12) comprises catholyte in its discharged state (ferrocyanide). In addition, the catholyte reservoir container (12) is connected in fluid communication with the positive compartment (10) through at least one conduct (13) in order to be able to receive catholyte from the positive compartment (10). Therefore, during operation of the battery, the catholyte reservoir container (12) receives catholyte (from the positive compartment (10)) in oxidized or reduced state, depending on the operating mode of the battery (charging or discharging).

The distribution of the flow is really important as it should be homogenous in the whole battery in order to assure for a good material transport to the electrodes. There are many mechanisms in the state of the art for allowing said distribution, commonly known as manifolds. This mechanism includes, for example, a gravitational tap feeder or a pump. Preferably, said mechanism is a pump.

Therefore, in a preferred embodiment the redox-flow battery (1) as defined above further comprises at least one pump connected to at least conducts (13) and/or (23).

The catholyte reservoir container (12) is configured to be modular, replaceable and scalable independent of the rest of the battery components. In a particular embodiment, the catholyte reservoir container is an external catholyte reservoir container (i.e. independent from the rest of the battery components). As mentioned before, increasing the amount of ferrocyanide in the alkaline solution generally increases the energy that the redox-flow battery is able to store and provide. Accordingly, the greater the volume of the tank (12), the more energy the battery is able to store and provide.

In a particular embodiment, the positive compartment (10) may be coupled to multiple catholyte reservoir containers (12), thereby providing for increased storage capacity.

Generally, the catholyte reservoir container (12) may be disposed adjacent to the positive compartment (10) or located at a distance from the positive compartment (10), so as the catholyte reservoir container (12) is in fluid communication to the compartment (10) through at least one conduit or pipe (13).

In a particular embodiment, the catholyte reservoir container (12) is made of a plastic material (e.g., polypropylene, polyethylene, etc.) or a plastic-coated material (e.g., a plastic-coated, steel tank) to substantially avoid corrosion due to galvanic coupling. In another particular embodiment, the catholyte reservoir container (12) is made of any metallic material that avoids corrosion, such as nickel or nickel alloys.

The catholyte reservoir container (12) comprises:
catholyte; and
an electroactive solid material (14).

In a particular embodiment, the catholyte reservoir container (12) comprises means to confine the electroactive solid material (14) while maintaining fluid communication with the compartment (10). In a more particular embodiment, the means to confine the electroactive solid material (14) while maintaining fluid communication with the compartment (10) are selected from filters and/or fluidized bed containers. Electroactive species in solid phase are able to store much larger amounts of charge per volume than electrolyte solutions containing dissolved active species. For example, $Ni(OH)_2$ that is commonly used in batteries of hybrid electric vehicles has a charge storage capacity of 1180 $AhL^{-1}$, which is two magnitudes higher than the maximum value of a ferrocyanide solution. However, solid active materials cannot be used in flow batteries since electrical contact between the cathode located at the positive compartment and the solid material located in the external reservoir is required. Usually, electroactive species of flow batteries are stored in the external reservoirs while the charge transfer occur in the positive compartment so that energy (size of the reservoirs) and power (size of the positive compartment) are decoupled. Thus, the positive compartment and the external reservoir are usually tens of centimeters or even meters apart from each other, which prevents charge transfer between electrode and solid electroactive material.

However, the authors of the present invention have aimed to design a battery (1) in which a charge transfer mediated by the pair ferricyanide/ferrocyanide occurs between the cathode and a solid electroactive material in an external reservoir; in particular a solid electroactive material confined in an external reservoir.

To this end, the solid electroactive material is confined within the container (12) in such a way that it is in direct contact with catholyte stored and it is flowing within the catholyte reservoir compartment (12). In a particular embodiment, the solid electroactive material is in the reservoir container (i.e. the solid electroactive material does not flow to the positive or negative compartment). In a more particular embodiment, the positive compartment or the negative compartment does not comprise solid electroactive material. In addition, during storing process of the battery (charging mode), the catholyte active species (pair ferrocyanide/ferricyanide) not only acts as electroactive species to store charge, but also as charge carrier between the cathode (11) at the positive compartment (10) and the solid electroactive material (14) located in the catholyte reservoir container (12). In this way, the charge transferred from the cathode (11) to the catholyte active species (as ferrocyanide) travels to the catholyte reservoir container (12) where the charge is transferred again from the catholyte active species (as ferricyanide) to the solid active material. After the charge is transferred from the electrolyte to the solid, the catholyte active species recover its initial state (as ferrocyanide) and returns to the cathode (11), where it is able to take and transport another charge from the cathode (11) to the solid active material (14) located in the catholyte reservoir container (12). This charge shuttle mediated by the ferrocyanide/ferricyanide pair allows storing charges in the solid material located in the reservoir (12); resulting in an increase in the overall energy density of the battery. Said charge transfer is highly reversible in the case of using a potassium ferrocyanide solution as catholyte and $Ni(OH)_2$ as solid electroactive material both in potassium hydroxide aqueous solution as explained below.

For spontaneous charge transfer between the catholyte and the electroactive solid material (14) specific conditions are needed. The spontaneity of charge transfer between catholyte and solid material (14) is explained based on the Gibbs free energy (equation 2) and Nernst equation (equation 3). In short, a reaction is spontaneous when $\Delta E$ is positive (equation 2).

$$\Delta G = -nF\Delta E \quad \text{(eq. 2)}$$

where $\Delta G$, n, F and $\Delta E$ are Gibbs free energy, number of exchange electrons, Faraday constant and cell potential ($E_{reduction} - E_{oxidation}$)

$$E = E^{0'} + RT/nF \cdot \text{Ln}(C_O/C_R) \quad \text{(eq. 3)}$$

where E, $E^{0'}$, R, T, n, F, $C_O$ y $C_R$ are redox potential, standard potential, constant of ideal gasses, temperature, number of exchange electrons, Faraday constant, activity of oxidized and reduced species.

During charging process of the battery (1), the charge transfer between the catholyte and the solid electroactive material occurs spontaneously when the redox potential of the catholyte is higher than that of the solid electroactive material (14). During discharge process of the battery (1), the charge transfer between the catholyte and the solid electroactive material occurs spontaneously when the redox potential of the catholyte is lower than that of the solid electroactive material (14).

For example, in the case of using a potassium ferrocyanide solution as catholyte and $Ni(OH)_2$ as solid electroactive material both in potassium hydroxide aqueous solution, during charging process, $\Delta E$ corresponds to the difference $E_{ferri}-E_{Ni(OH)2}$, which is the reduction of ferricyanide and the oxidation of $Ni(OH)_2$, respectively. During discharging process, $\Delta E$ corresponds to the difference $E_{NiOOH}-E_{ferro}$, which is the reduction of NiOOH and oxidation of ferrocyanide, respectively. The potential of the pair $Ni(OH)_2$/NiOOH does not vary significantly with state of charge, but the potential of dissolved species (the pair ferrocyanide/ferricyanide) varies with state of charge according to Nernst equation (equation 3). This implies that reactions between ferrocyanide/ferricyanide and $Ni(OH)_2$/NiOOH are spontaneous only in certain ranges of state of charge.

Hence, working conditions of the battery (1) of the present invention can be adjusted depending on the final application to increase the driving force of charge transfer during charging process or discharging process.

Therefore, in a preferred embodiment, the redox potential of the solid electroactive material at 50% state-of-charge and catholyte at 50% state-of-charge should not differ more than 200 mV for the charge transfer between redox electrolyte and solid electroactive material to be thermodynamically reversible. Said state-of-charge represents the amount of charge remaining in the battery with respect to the maximum amount of storable charge.

The solid electroactive material is a material that is able to reversibly storing charge. In particular, the solid electroactive material is a metal oxide, a metal hydroxide, a metal oxyhydroxide or combination thereof. The solid electroactive material remains in solid phase in both oxidized and reduced states.

In a particular embodiment, the solid electroactive material is selected from the group consisting of a metal hydroxide, a metal oxyhydroxide or a combination thereof; preferably is a metal hydroxide.

Non-limiting examples of suitable solid electroactive materials in the redox-flow battery of the present invention (1) are $Ni(OH)_2$ $Co(OH)_2$, $Mn(OH)_2$ and $Ni_xMn_yCo_z(OH)_2$, wherein x, y and z varies between 0 and 1.

In a preferred embodiment, the solid electroactive material is $Ni(OH)_2$.

The solid electroactive material is usually incorporated to the catholyte reservoir container (12) before operation of the battery (1), but it can be also added during operation.

In a preferred embodiment, the concentration of ferrocyanide ranges from 0.1 to 1.5 M, more preferably from 0.3 to 1 M, whereas the concentration of solid electroactive material may range from 50 g/L to 1.000 g/L, more preferably from 150 g/L to 500 g/L.

In a particular embodiment, the redox-flow battery as defined above presents an energy density between 10 and 100 $AhL^{-1}$.

Negative Compartment

The negative compartment (20) comprised in the redox-flow battery (1) of the present invention comprises:
a negative electrode (21); and
an anolyte.

The negative electrode (21) is where the reduction and oxidation of anolyte active species takes place.

Non-limiting examples of suitable negative electrodes (21) in the redox-flow battery of the present invention (1) are graphite felt, carbon felt, carbon nanotubes and other porous carbonaceous matrices.

In a preferred embodiment, the negative electrode (or anode) (21) is made of graphite, more preferably graphite felt.

The anolyte comprised in the negative compartment (20) of the redox-flow battery (1) of the present invention is an alkaline solution.

As for the catholyte, the alkalinity of the anolyte is used to maintain a high ionic conductivity between the electrodes, while minimizing corrosion. In a preferred embodiment, said alkalinity is obtained by using a hydroxyl ion-conducting media, more preferably an alkaline metal hydroxide, even more preferably, the alkaline metal hydroxide is potassium hydroxide (KOH).

Non-limiting examples of suitable alkaline solutions as anolyte in the redox-flow battery of the present invention (1) are alkaline solutions of zinc oxide, benzoquinones, anthraquinone, phenazines, alloxazines and vitamins.

In a preferred embodiment, the anolyte is a potassium hydroxide aqueous solution of zinc oxide, anthraquinone or a phenazine derivate.

During charging process of the battery (1) of the present invention, the anolyte flows through the negative electrode and the anolyte species are reduced.

Anolyte Reservoir Container

The anolyte reservoir container or tank (22) comprised in the redox-flow battery (1) of the present invention is an external container configured to store and receive anolyte (in oxidized or reduced state depending on the charging or discharging mode of the battery) from the negative compartment (20). Before operation of the battery (1), the anolyte reservoir container (22) comprises anolyte in its discharged state (oxidized state). In addition, the anolyte reservoir container (22) is connected in fluid communication with the negative compartment (20) through at least one conduct (23) in order to be able to receive anolyte from the negative compartment (20). Therefore, during operation of the battery, the anolyte reservoir container (22) receives anolyte (from the negative compartment (20)) in oxidized or reduced state, depending on the operating mode of the battery (charging or discharging)

The anolyte reservoir container (22) is configured to be modular, replaceable and scalable independent of the rest of the battery components. Increasing the amount of anolyte active species in the alkaline solution generally increases the energy that the redox-flow battery is able to store and provide. Accordingly, the greater the volume of the tank (22), the more energy the battery is able to store and provide.

In a particular embodiment, the anolyte reservoir container (22) comprises anolyte and a solid electroactive material, wherein said solid electroactive material is confined within the container and is selected from the group consisting of a metal oxide, a metal hydroxide, a metal oxyhydroxide or a combination thereof. In a particular embodiment, the solid electroactive material is selected from the group consisting of a metal hydroxide, a metal oxyhydroxide or a combination thereof; preferably is a metal hydroxide. Particularly, the solid electroactive material remains in solid phase in both oxidized and reduced states. Non-limiting examples of suitable solid electroactive materials in the redox-flow battery of the present invention (1) are $Ni(OH)_2$, $Co(OH)_2$, $Mn(OH)_2$ and $Ni_xMn_yCo_z(OH)_2$, wherein x, y and z varies between 0 and 1. In a preferred embodiment, the solid electroactive material is $Ni(OH)_2$.

In a particular embodiment, the anolyte reservoir container (22) comprises means to confine the electroactive solid material while maintaining fluid communication with the compartment (20). In a more particular embodiment, the means to confine the electroactive solid material while maintaining fluid communication with the compartment are selected from filters and/or fluidized bed containers.

In a particular embodiment, the negative compartment (20) may be coupled to multiple anolyte reservoir containers (22), thereby providing for increased storage capacity.

Generally, the anolyte reservoir container (22) may be disposed adjacent to the negative compartment (20) or located at a distance from the negative compartment (20), so as the anolyte reservoir container (22) is in fluid communication to the compartment (20) through at least one conduit or pipe (23).

In a particular embodiment, the anolyte reservoir container (22) is made of a plastic material (e.g., polypropylene, polyethylene, etc.) or a plastic-coated material (e.g., a plastic-coated, steel tank) to substantially avoid corrosion due to galvanic coupling. In another particular embodiment, the anolyte reservoir container (22) is made of any metallic material that avoids corrosion, such as nickel or nickel alloys.

Separator

The redox-flow battery (1) of the present invention may optionally comprises a separator (30) disposed between the positive compartment (10) and the negative compartment (20).

Suitable separators in the redox-flow battery (1) of the present invention are thin, porous films or membranes usually made of a polymeric material.

In a particular embodiment, this separator is an ion-exchange membrane or a size-exclusion (microporous) membrane that allows passing of positively or negatively charge ions from the anode or the cathode depending on the operation mode of the battery (charging or discharging mode) in order to maintain the electroneutrality.

In a preferred embodiment, the separator is an ion exchange membrane such as Nafion membrane.

Power/Source Load

The redox-flow battery (1) of the present invention also comprises a power/load source (40). The power/load source (40) is any external electrical device such as an electrical grid, an electric vehicle, a domestic appliance or a sensor, that draws/transfers energy from/to the battery. In general, the power/load source have controllable voltages and/or current supplies or uptakes.

Operation of the Battery

As mentioned before, the redox-flow battery (1) of the present invention is configured to act as an energy storage and delivery system, i.e. it is configured to be reversibly charged and discharged.

Therefore, another aspect of the present invention is directed to a method of storing electricity comprising the steps of:

a) providing a redox-flow battery (1) as define above;
b) oxidizing the ferrocyanide species of the catholyte at the positive compartment (10) to ferricyanide while the anolyte active species are reduced to the corresponding reduced state at the negative compartment (20);
c) letting flow the oxidized catholyte of step (b) into the catholyte reservoir container (12) and the reduced anolyte of step (b) into the anolyte reservoir container (22); and
d) storing charge in the solid electroactive material at the catholyte reservoir container by charge transfer between the oxidized catholyte and the solid electroactive material (14) so that ferricyanide species of the oxidized catholyte of step (c) are reduced back to ferrocyanide by oxidation of the solid electroactive material at the catholyte reservoir container (12).

An illustrative example on how the redox-flow battery (1) of the invention work as storage system (charging mode) is following described.

During charging process of the battery (1) of the present invention, the catholyte flows through the positive electrode (step (b) of the method of storing electricity of the present invention) and the ferrocyanide species are oxidized to ferricyanide species through the following reaction (equation 4):

$$Fe(CN)_6^{-4} \rightarrow Fe(CN)_6^{-3} + e^-$$ (eq. 4)

The electron released via the above reaction on the cathode of the battery (1) of the present invention moves through an external circuit, i.e. the power/load source, to do useful work.

At the same time, the anolyte active species are reduced to the corresponding reduced state at the negative compartment (20) (step (b) of the method of storing electricity of the present invention).

After completion of the oxidation, the catholyte is drawn to the catholyte reservoir container (12) (step (c) of the method of storing electricity of the present invention). At the same time, the reduced anolyte of step (b) flows into the anolyte reservoir container (22).

Then, the oxidized catholyte (as ferricyanide) received from the positive compartment is reduced back to ferrocyanide by electron transfer from the solid electroactive material (step (d) of the method of storing electricity of the present invention). Consequently, the electroactive material is oxidized.

As an example, if Ni(OH)$_2$ is used as solid electroactive material (FIG. 2), the following reactions (equations 5 and 6) are involved during charging process:

$$Fe(CN)_6^{-3} + e^- \rightarrow Fe(CN)_6^{-4}$$ (eq. 5)

$$Ni(OH)_2 \rightarrow NiOOH + e^-$$ (eq. 6)

After ferricyanide is reduced back to ferrocyanide in the catholyte reservoir container (12) during charging process, it returns to the positive compartment (10) in its discharged state (ferrocyanide). Once the solid active material is fully oxidized (charged), ferricyanide accumulates till the battery is fully charged.

As mentioned before, the redox-flow battery (1) of the present invention is also configured to act as delivery system, i.e. it is configured to be discharged.

Therefore, another aspect of the present invention is directed to a method of delivering electricity comprising the steps of:

a) providing a redox-flow battery as defined above;
b) reducing the ferricyanide of the catholyte at the positive compartment (10) to ferrocyanide while the reduced anolyte active species are oxidized back to the corresponding oxidized state at the negative compartment (20);
c) letting flow the reduced catholyte of step (b) into the catholyte reservoir container (12) and the oxidized anolyte of step (b) into the anolyte reservoir container (22); and
d) delivering the charge stored in the solid electroactive material in its oxidized state at the catholyte reservoir container by charge transfer between the reduced catholyte and the oxidized solid electroactive material (14) so that the ferrocyanide species of the reduced catholyte of step (c) are oxidized back to ferricyanide by reduction of the solid electroactive material at the cathode reservoir container (12).

During discharging process of the battery (1) of the present invention, the catholyte flows through the positive electrode (step (b) of the method of delivering electricity of the present invention) and the ferricyanide species are reduced to ferrocyanide species through the following reaction (equation 7):

$$Fe(CN)_6^{-3} + e^- \rightarrow Fe(CN)_6^{-4} \qquad \text{(eq. 7)}$$

The electron employed in the above reaction on the cathode of the battery (1) of the present invention comes from an external circuit, i.e. the load/power source.

At the same time, the reduced anolyte active species are oxidized to the corresponding oxidized state at the negative compartment (20) (step (b) of the method of delivering electricity of the present invention).

After completion of the reduction, the catholyte is drawn to the catholyte reservoir container (12) (step (c) of the method of delivering electricity of the present invention). At the same time, the oxidized anolyte of step (b) flows into the anolyte reservoir container (22).

Then, the reduced catholyte (as ferrocyanide) received from the positive compartment is oxidized back to ferrocyanide by electron transfer with the solid electroactive material (step (d) of the method of storing electricity of the present invention). Consequently, the electroactive material is reduced.

As an example, if $Ni(OH)_2$ is used as solid electroactive material (FIG. 2), the following reactions (equations 7 and 8) are involved during discharging process:

$$Fe(CN)_6^{-4} \rightarrow Fe(CN)_6^{-3} + e^- \qquad \text{(eq. 8)}$$

$$NiOOH + e^- \rightarrow Ni(OH)_2 \qquad \text{(eq. 9)}$$

After ferrocyanide is oxidized back to ferricyanide in the catholyte reservoir container (12) during discharging process, it returns to the positive compartment (10) in its charged state (ferricyanide). Once the solid active material is fully reduced (discharged), ferrocyanide accumulates till the battery is fully discharged.

Applications

Additional aspects of the present invention are directed to the use of the redox-flow battery (1) as defined above to store or deliver energy. To this end, the redox-flow battery (1) of the present invention may be used individually, as modular redox-flow battery system, or in combination with other energy storage technologies (e.g., supercapacitors, etc.) and may be integrated into or with various systems and/or devices to improve efficiency, address energy demands, etc.

Furthermore, the redox-flow battery (1) of the invention may be used in a variety of applications having different energy delivery and/or storage needs, including, but not limited to, very large scale applications (e.g., utilities, functioning as a green energy source for a smart grid, energy storage for use in combination with renewable energy resources such as wind and solar power, etc.) and smaller applications (e.g. backup power, residential power, electromobility sector, etc.).

Examples

Example 1—Evaluation of Spontaneity and Reversibility of Electrochemical Reactions Between the Pair Ferrocyanide/Ferricyanide and $Ni(OH)_2/NiOOH$ The spontaneity of electrochemical reactions between the pair ferrocyanide/ferricyanide and $Ni(OH)_2/NiOOH$ as solid electroactive material (14) was evaluated. The differences in color between $Ni(OH)_2$ and NiOOH allows us to observe transformations between these two phases [M. K. Carpenter et al., Solar Energy Materials, 1987, 16, 333-346]. FIG. 3 shows three photograms of a video for the following experiment. A sample of solid $Ni(OH)_2$ was placed on a paper filter (FIG. 3a). A solution of ferricyanide was added to the sample. When adding the ferricyanide, the particles changed color (FIG. 3b), which indicates oxidation of $Ni(OH)_2$ to NiOOH.

After rinsing the sample with 1M KOH solution, ferrocyanide was added to the sample of NiOOH. The addition of ferrocyanide led to another change of color (FIG. 3c), which indicates reduction of NiOOH back to $Ni(OH)_2$. This experiment shows that ferricyanide is able to oxidize $Ni(OH)_2$ to NiOOH, while ferrocyanide is able to reduce NiOOH to $Ni(OH)_2$.

To confirm that these processes are also reversible in a redox-flow battery, we assembled an electrochemical flow cell that contained a ferrocyanide solution. In an external reservoir, a sample of $Ni(OH)_2$ was immersed (FIG. 4a). Ferrocyanide in the solution was electrochemically oxidized to ferricyanide in the cathode (11). When the electrochemically generated ferricyanide reached the external reservoir (12), it oxidized the particles of $Ni(OH)_2$ to NiOOH, changing the color of the sample(FIG. 4b). Once the first step was finalized, ferricyanide solution that was previously generated was electrochemically reduced to ferrocyanide in a second step. When the electrochemically generated ferocyanide reached the external reservoir (12), it reduced NiOOH to $Ni(OH)_2$, which was visualized by the change in color (FIG. 4c).

Reversible reactions between ferrocyanide/ferricyanide and $Ni(OH)_2/NiOOH$ are spontaneous only in certain ranges of state of charge as illustrated in FIG. 5. Therefore, the redox potential of the solid electroactive material at 50% state-of-charge and catholyte at 50% state-of-charge should not differ more than 200 mV for the charge transfer between redox electrolyte and solid electroactive material to be thermodynamically reversible.

FIG. 6 shows the evolution of the redox potential as a function of the concentration of KOH that was measured experimentally at 50% state of charge for a ferrocyanide solution and $Ni(OH)_2$ solid electroactive material. The optimal conditions were found for 1M KOH. However, the kinetics of charge transfer during charging process can be increased, in detriment of discharging process, by increasing the concentration of KOH above 1M. This case would be of interest for applications in which faster charging than discharging is required. Likewise, the kinetics of charge transfer during discharging process can be increased, in detriment of charging process, by decreasing the concentration of KOH below 1 M. This case would be of interest for applications in which faster discharging than charging is required Example 2—Electrochemical Demonstration in a Flow Symmetrical Cell A symmetrical flow cell was tested in which ferrocyanide solution and ferricyanide solution were placed in the positive (10) and negative compartment (20), respectively. A large excess of ferricyanide (three time the amount of ferrocyanide) was added so that the positive compartment (10) became the limiting side, which allowed easy evaluation of reactions occurring in that compartment. In addition, interfering of hydrogen evolution and oxygen reduction were avoided (Luo et al. Nano Energy. 2017, 42, 215-221). Therefore, all values were referred to the limiting side, which initially contained ferrocyanide.

To quantify the amount of charge stored in the solid electroactive material (14), a series of experiments were performed in which the amount of charge stored in the pair ferrocyanide/ferricyanide was known as well as the mass of Ni(OH)$_2$ added to the external reservoirs. Ni(OH)$_2$ electrodes taken from commercial Ni-MH batteries were employed. The charge storage capacity of these electrodes was 125 mA $g_{electrode}^{-1}$, which means that the content of Ni(OH)$_2$ in the electrode was ca. 50% since the specific capacity of Ni(OH)$_2$ is 250 mAh $g_{Ni(OH)2}^{-1}$. In the absence of Ni(OH)$_2$ electrode, the charge stored in the ferrocyanide/ferricyanide electrolyte solution was very close to its maximum theoretical value since experimental value of 220 mAh, out of the maximum theoretical value of 240 mAh for 30 mL of 0.3 M ferrocyanide. In the presence of Ni(OH)$_2$ electrode in the external reservoir, the reversible charge increased significantly (FIG. 7). 414 mAh and 618 mAh were reversibly stored when 4 g and 8 g of Ni(OH)$_2$ electrode, respectively, were added. These values correspond to an increase of 194 mAh and 398 mAh with respect to the cell without Ni(OH)$_2$ electrode, which means a utilization rate of 39% and 40% for a concentration of solid in electrolyte of 65 $g_{Ni(OH)2}L^{-1}$ and 130 $g_{Ni(OH)2}L^{-1}$, respectively. In other words, Ni(OH)$_2$ electrodes stored 50 mAh $g_{electrode}^{-1}$, out of the maximum value of 125 mAh $g_{electrode}^{-1}$.

The charge storage capacity was further increased by changing the cell engineering and using cylindrical tank of smaller diameter. While a value of 20 Ah/L was demonstrated in the initial cell design, reduction of the diameter of the cylindrical tank allowed us to increase this value to 28 Ah/L for a concentration of solid in electrolyte of 240 $g_{Ni(OH)2}L^{-1}$, which shows that improved performances are expected from optimization of system engineering.

Example 3—Flow Battery of Quinone K$_4$Fe(CN)$_6$

FIG. 8 shows charge stored in a redox-flow battery based on quinone (9 milimoles of 2,6 dihydroxi-anthraquinone assuming 1.5 electrons=360 mAh)/K$_4$Fe(CN)$_6$ (9 milimoles and 1 electron=240 mAh) in 1.5 M KOH cycled between 0.6 V and 1.38 V for 20 cycles. In the absence of Ni(OH)$_2$ electrode, the reversible stored charge was limited by the moles of K$_4$Fe(CN)$_6$, which implies a maximum reversible charge of 240 mAh. The experimental value was 230 mAh in the first cycle, retaining 91% after 20 cycles. When 4 g of Ni(OH)$_2$ electrode were added to the external reservoir, the reversible stored charge in the first cycle was 340 mAh retaining 81% after 20 cycles. The reversible stored charge in the presence of Ni(OH)$_2$ electrode remained above the maximum value of ferrocyanide electrolyte, which demonstrates that the solid material is able to store charge reversible in a flow quinone—K$_4$Fe(CN)$_6$.

Example 4—Flow Battery of Phenazine-Derivative//K$_4$Fe(CN)$_6$

FIG. 9 shows charge stored in a flow battery based on phenazine (3 milimoles of phenazine assuming 2 electrons=160 mAh)/K$_4$Fe(CN)$_6$ (3 milimoles and 1 electron=80 mAh) in 1 M KOH cycled between 0.8 V and 1.65 V for 100 cycles. In the absence of Ni(OH)$_2$ electrode, the reversible stored charge was limited by the moles of K$_4$Fe(CN)$_6$, which implies a maximum reversible charge of 80 mAh. The experimental value was 80 mAh in the absence of Ni(OH)$_2$ electrode in the reservoir. When 3 g of Ni(OH)$_2$ electrode were added to the external reservoir, the reversible stored charge in the first cycle was 135 mAh retaining 92% after 100 cycles. The reversible stored charge in the presence of Ni(OH)$_2$ electrode remained above the maximum value of ferrocyanide electrolyte, which demonstrates that the solid material was able to store charge reversible in a flow phenazine-derivative II K$_4$Fe(CN)$_6$.

Example 5—Hybrid-Flow Battery of Zn II K$_4$Fe(CN)$_6$

FIG. 10 shows charge stored in a flow battery based on ZnO (6.5 milimoles of zinc assuming 2 electrons=348 mAh)/K$_4$Fe(CN)$_6$ (3.9 milimoles and 1 electron=104 mAh) in 1 M KOH cycled between 0.6 V and 1.9 V for 20 cycles. In the absence of Ni(OH)$_2$ electrode (first 9 cycles), the reversible stored charge was limited by the moles of K$_4$Fe(CN)$_6$, which implies a maximum reversible charge of 104 mAh.

The experimental values were ca. 102 mAh in the first cycles. When 4 g of Ni(OH)$_2$ electrode were added to the external reservoir, the reversible stored charge increased to 120 mAh. The reversible stored charge in the presence of Ni(OH)$_2$ electrode remained above the maximum value of ferrocyanide electrolyte, which demonstrates that the solid material is able to store charge reversible in a flow quinone—K$_4$Fe(CN)$_6$. In addition, decreasing the current density led to further increase in reversible stored charge to 160-170 mAh, which showed that higher utilization rate of the solid is possible if charge transfer kinetics between electrolyte and solid were improved.

The invention claimed is:

1. A redox-flow battery (1) comprising:
   a) a positive compartment (10) comprising a positive electrode (11) and a catholyte, wherein said catholyte is an alkaline ferrocyanide solution;
   b) a catholyte reservoir container (12) connected in fluid communication with the positive compartment (10) through at least one conduct (13) and said container (12) comprising:
      catholyte and
      a solid electroactive material (14),
      wherein said solid electroactive material is confined within the container; wherein the solid electroactive material is a metal hydroxide selected from Ni(OH)$_2$, Co(OH)$_2$, Mn(OH)$_2$ or Ni$_x$Mn$_y$Co$_z$(OH)$_2$, wherein x, y and z varies between 0 and 1;
   c) a negative compartment (20) comprising a negative electrode (21) and an anolyte, wherein said anolyte is an alkaline solution;
   d) an anolyte reservoir container (22) connected in fluid communication with the negative compartment (20) through at least one conduct (23) and said container (22) comprising anolyte; and
   e) a power/load source (40).

2. The redox-flow battery according to claim 1, wherein the catholyte is a potassium ferrocyanide solution.

3. The redox-flow battery according to claim 1, wherein the solid electroactive material (14) is Ni(OH)$_2$.

4. The redox-flow battery according to claim 1, wherein the positive electrode (11) is made of graphite felt.

5. The redox-flow battery according to claim 1, wherein the anolyte is a potassium hydroxide aqueous solution of zinc oxide, anthraquinone or a phenazine derivate.

6. The redox-flow battery according to claim 1, wherein the negative electrode (21) is made of graphite felt.

7. The redox-flow battery according to claim 1, further comprising at least one pump connected to at least conducts (13) and/or (23).

8. The redox-flow battery according to claim 1, further comprising a separator (30) disposed between the positive compartment (10) and the negative compartment (20).

9. The redox-flow battery according to claim 1, wherein the concentration of the ferrocyanide species in the catholyte is in a range between 0.1 and 1.5 M and the concentration of the solid electroactive material (14) is in a range between 50 g/L and 1.000 g/L.

10. The redox-flow battery according to claim 9, wherein the concentration of ferrocyanide ranges from 0.1 to 1.5 M, and the concentration of solid electroactive material ranges from 150 g/L to 500 g/L.

11. An energy storage and/or delivery system comprising at least one redox-flow battery (1) according to claim 1.

12. A method of storing electricity comprising the steps of:
   a) providing a redox-flow battery (1) comprising:
      (i) a positive compartment (10) comprising a positive electrode (11) and a catholyte, wherein said catholyte is an alkaline ferrocyanide solution comprising ferrocyanide species;
      (ii) a catholyte reservoir container (12) connected in fluid communication with the positive compartment (10) through at least one conduct (13) and said container (12) comprising:
         catholyte and
         a solid electroactive material (14),
         wherein said solid electroactive material is confined within the container; wherein the solid electroactive material is a metal hydroxide selected from $Ni(OH)_2$, $Co(OH)_2$, $Mn(OH)_2$ or $Ni_xMn_yCo_z(OH)_2$, wherein x, y and z varies between 0 and 1;
      (iii) a negative compartment (20) comprising a negative electrode (21) and an anolyte, wherein said anolyte is an alkaline solution; and wherein said anolyte comprises anolyte active species;
      (iv) an anolyte reservoir container (22) connected in fluid communication with the negative compartment (20) through at least one conduct (23) and said container (22) comprising anolyte; and
      (v) a power/load source (40);
   b) oxidizing the ferrocyanide species of the catholyte at the positive compartment (10) to ferricyanide to obtain an oxidized catholyte, while the anolyte active species are reduced to their corresponding reduced state at the negative compartment (20) to obtain a reduced anolyte;
   c) letting flow the oxidized catholyte of step (b) into the catholyte reservoir container (12) and the reduced anolyte of step (b) into the anolyte reservoir container (22); and
   d) storing charge in the solid electroactive material at the catholyte reservoir container by charge transfer between the oxidized catholyte and the solid electroactive material (14) so that ferricyanide species of the oxidized catholyte of step (c) are reduced back to ferrocyanide by oxidation of the solid electroactive material at the catholyte reservoir container (12).

13. A method of delivering electricity comprising the steps of:
   a) providing a redox-flow battery according to claim 1 comprising an anolyte and a catholyte; wherein the catholyte comprises ferricyanide and wherein the anolyte comprises reduced anolyte active species;
   b) reducing the ferricyanide of the catholyte at the positive compartment (10) to ferrocyanide to obtain a reduced catholyte, while the reduced anolyte active species are oxidized back to their corresponding oxidized state at the negative compartment (20) to obtain an oxidized anolyte;
   c) letting flow the reduced catholyte of step (b) into the catholyte reservoir container (12) and the oxidized anolyte of step (b) into the anolyte reservoir container (22); and
   d) delivering charge stored in the solid electroactive material in its oxidized state at the catholyte reservoir container by charge transfer between the reduced catholyte and the solid electroactive material in its oxidized state (14) so that the ferrocyanide species of the reduced catholyte of step (c) are oxidized back to ferricyanide by reduction of the solid electroactive material at the cathode reservoir container (12).

\* \* \* \* \*